US008213952B2

(12) United States Patent
Misumi

(10) Patent No.: US 8,213,952 B2
(45) Date of Patent: Jul. 3, 2012

(54) COMMUNICATION SYSTEM

(75) Inventor: Kazuhito Misumi, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 714 days.

(21) Appl. No.: 12/401,432

(22) Filed: Mar. 10, 2009

(65) Prior Publication Data
US 2009/0247085 A1 Oct. 1, 2009

(30) Foreign Application Priority Data

Mar. 25, 2008 (JP) ................................. 2008-078631

(51) Int. Cl.
*H04B 15/00* (2006.01)
*H04B 17/00* (2006.01)
(52) U.S. Cl. ................. 455/452.2; 455/452.1; 455/63.1; 455/63.3; 370/329
(58) Field of Classification Search .................. 455/63.3, 455/437, 67.11, 450, 426.1, 452.1, 452.2, 455/63.1; 370/329
See application file for complete search history.

(56) References Cited

U.S. PATENT DOCUMENTS

| 5,774,805 | A | 6/1998 | Zicker |
| 7,006,451 | B2 | 2/2006 | Kuwahara |
| 2006/0177049 | A1 | 8/2006 | Ukon |

FOREIGN PATENT DOCUMENTS

| JP | 2000-511731 T | 9/2000 |
| JP | 2002-198867 A | 7/2002 |
| JP | 2005-203898 A | 7/2005 |
| JP | 2005-323032 A | 11/2005 |
| JP | 2006-211147 A | 8/2006 |
| JP | 2007-150836 A | 6/2007 |
| JP | 2007-274538 A | 10/2007 |

OTHER PUBLICATIONS

Japan Patent Office; Notification of Reason for Refusal in Japanese Patent Application No. 2008-078631 (counterpart to the above-captioned U.S. patent application) mailed Apr. 13, 2010.

*Primary Examiner* — Dinh T. Le
(74) *Attorney, Agent, or Firm* — Baker Botts L.L.P.

(57) ABSTRACT

A communication system includes a main communication unit, a subcommunication unit that communicates with the main communication unit by using first wireless channels, and an external communication unit that communicates with the main communication unit by using second wireless channels. The subcommunication unit includes a state detection unit that detects a use state of the second wireless channels. The main communication unit includes a state acquisition unit that acquires the use state of the second wireless channels, a selection unit that selects a predetermined number of the first wireless channels with the less effect of radio wave interaction in the wireless communications based on the use state, a channel determination unit that determines one of the predetermined number of the first wireless channels, and a first wireless communication unit that communicates with the subcommunication unit using the one of the predetermined number of the first wireless channels.

9 Claims, 13 Drawing Sheets

FIG. 2

EXAMPLE OF CHANNEL CORRESPONDENCE TABLE

| WIRELESS LAN CHANNEL | DCL CHANNEL (OVERLAPPED WITH WIRELESS LAN CHANNEL) |
|---|---|
| wch1 | dch4~25 |
| wch2 | dch9~30 |
| wch3 | dch15~36 |
| wch4 | dch20~41 |
| wch5 | dch26~47 |
| wch6 | dch31~52 |
| wch7 | dch37~58 |
| wch8 | dch42~63 |
| wch9 | dch48~69 |
| wch10 | dch53~74 |
| wch11 | dch59~80 |
| wch12 | dch64~85 |
| wch13 | dch70~89 |
| wch14 | dch83~89 |

FIG. 3A

EXAMPLE OF MEASUREMENT POINT TABLE

| WIRELESS LAN CHANNEL | MEASUREMENT POINT (CENTRAL FREQUENCY) |
|---|---|
| wch1 | 2412 MHz |
| wch2 | 2417 MHz |
| wch3 | 2422 MHz |
| wch4 | 2427 MHz |
| wch5 | 2432 MHz |
| wch6 | 2437 MHz |
| wch7 | 2442 MHz |
| wch8 | 2447 MHz |
| wch9 | 2452 MHz |
| wch10 | 2457 MHz |
| wch11 | 2462 MHz |
| wch12 | 2467 MHz |
| wch13 | 2472 MHz |
| wch14 | 2484 MHz |

FIG. 3B

EXAMPLE OF MOBILE DEVICE RECEIVED ELECTRIC FIELD STRENGTH TABLE

| WIRELESS LAN CHANNEL | RECEIVED ELECTRIC FIELD STRENGTH (AT MEASUREMENT POINT) |
|---|---|
| wch1 | 7 |
| wch2 | 2 |
| wch3 | 3 |
| wch4 | 5 |
| wch5 | 1 |
| wch6 | 1 |
| wch7 | 2 |
| wch8 | 8 |
| wch9 | 3 |
| wch10 | 4 |
| wch11 | 2 |
| wch12 | 3 |
| wch13 | 1 |
| wch14 | 1 |

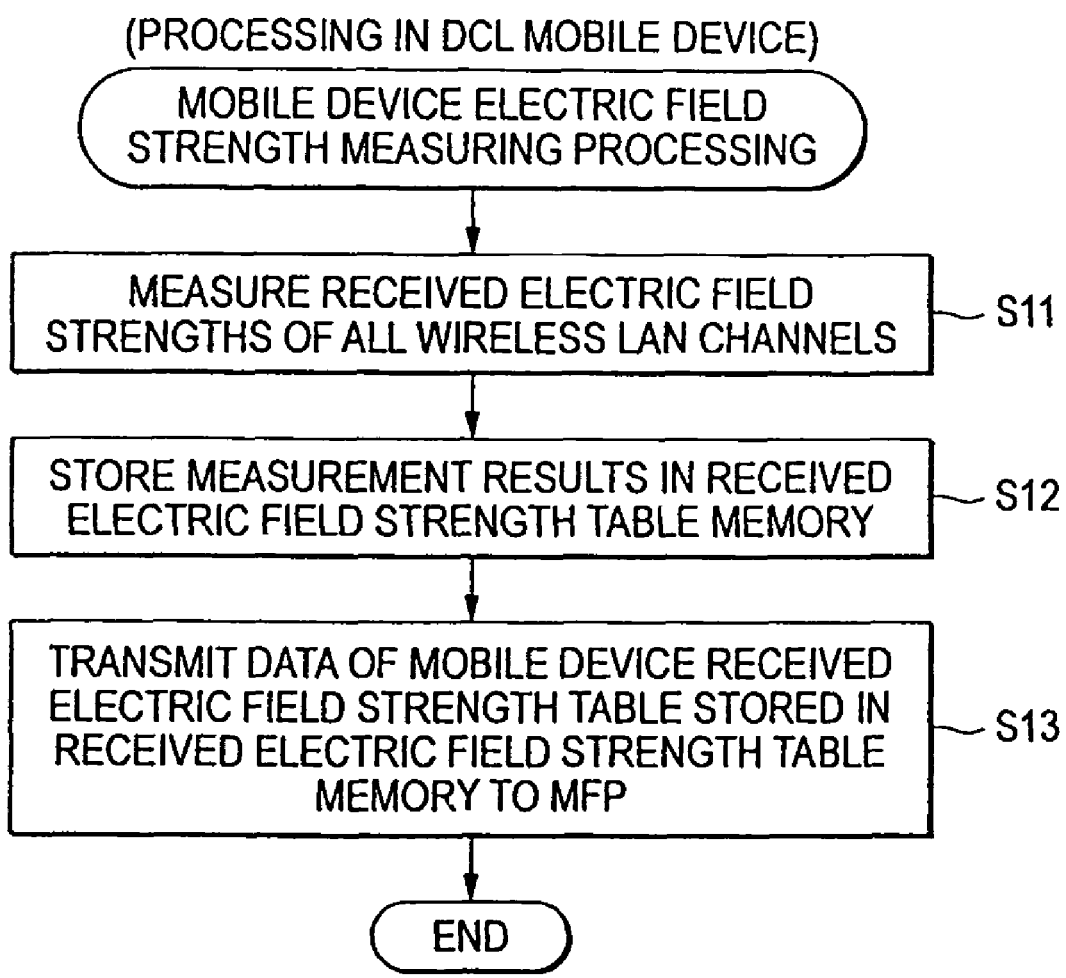

FIG. 6A

EXAMPLE OF CONTENTS OF
DCL CHANNEL SELECTION TABLE

| DCL CHANNEL | STATUS VALUE |
|---|---|
| dch1 | ○ |
| dch2 | ○ |
| ⋮ | ⋮ |
| dch15 | × |
| dch16 | × |
| dch17 | × |
| dch18 | × |
| ⋮ | ⋮ |
| dch35 | × |
| dch36 | × |
| ⋮ | ⋮ |
| dch89 | ○ |

DCL CHANNELS DUPLICATE WITH WIRELESS LAN CHANNEL "wch3"

FIG. 6B

EXAMPLE OF CONTENTS OF
DCL CHANNEL SELECTION TABLE

| DCL CHANNEL | STATUS VALUE |
|---|---|
| dch1 | ○ |
| dch2 | ○ |
| ⋮ | ⋮ |
| dch42 | △ (→×) |
| dch43 | △ (→×) |
| dch44 | △ (→×) |
| dch45 | △ (→×) |
| ⋮ | ⋮ |
| dch62 | △ (→×) |
| dch63 | △ (→×) |
| ⋮ | ⋮ |
| dch89 | ○ |

DCL CHANNELS DUPLICATE WITH WIRELESS LAN CHANNEL "wch8"

FIG. 7

EXAMPLE OF CONTENTS OF
DCL CHANNEL SELECTION TABLE

| DCL CHANNEL | STATUS VALUE |
|---|---|
| dch1 | ○ |
| dch2 | ○ |
| ⋮ | ⋮ |
| dch42 | △ (→○) |
| dch43 | △ (→○) |
| ⋮ | ⋮ |
| dch51 | △ (→○) |
| dch52 | △ (→×) |
| dch53 | △ (→×) |
| dch54 | △ (→○) |
| ⋮ | ⋮ |
| dch62 | △ (→○) |
| dch63 | △ (→○) |
| ⋮ | ⋮ |
| dch89 | ○ |

DCL CHANNELS DUPLICATE WITH WIRELESS LAN CHANNEL "wch8" (brace covering dch42 through dch63)

MPF31

32 — ROM
32a — CHANNEL CORRESPONDENCE TABLE MEMORY
32b — NUMBER-OF-EXCLUDED-CHANNELS TABLE MEMORY

EXAMPLE OF CONTENTS OF NUMBER-OF-EXCLUDED-CHANNELS SELECTION TABLE

| RECEIVED ELECTRIC FIELD STRENGTH | NUMBER OF EXCLUDED CHANNELS |
|---|---|
| 10 | 10 |
| 9 | 8 |
| 8 | 6 |
| 7 | 4 |
| 6 | 3 |
| 5 | 2 |
| 4 | 1 |
| 3 | 0 |
| 2 | 0 |
| 1 | 0 |

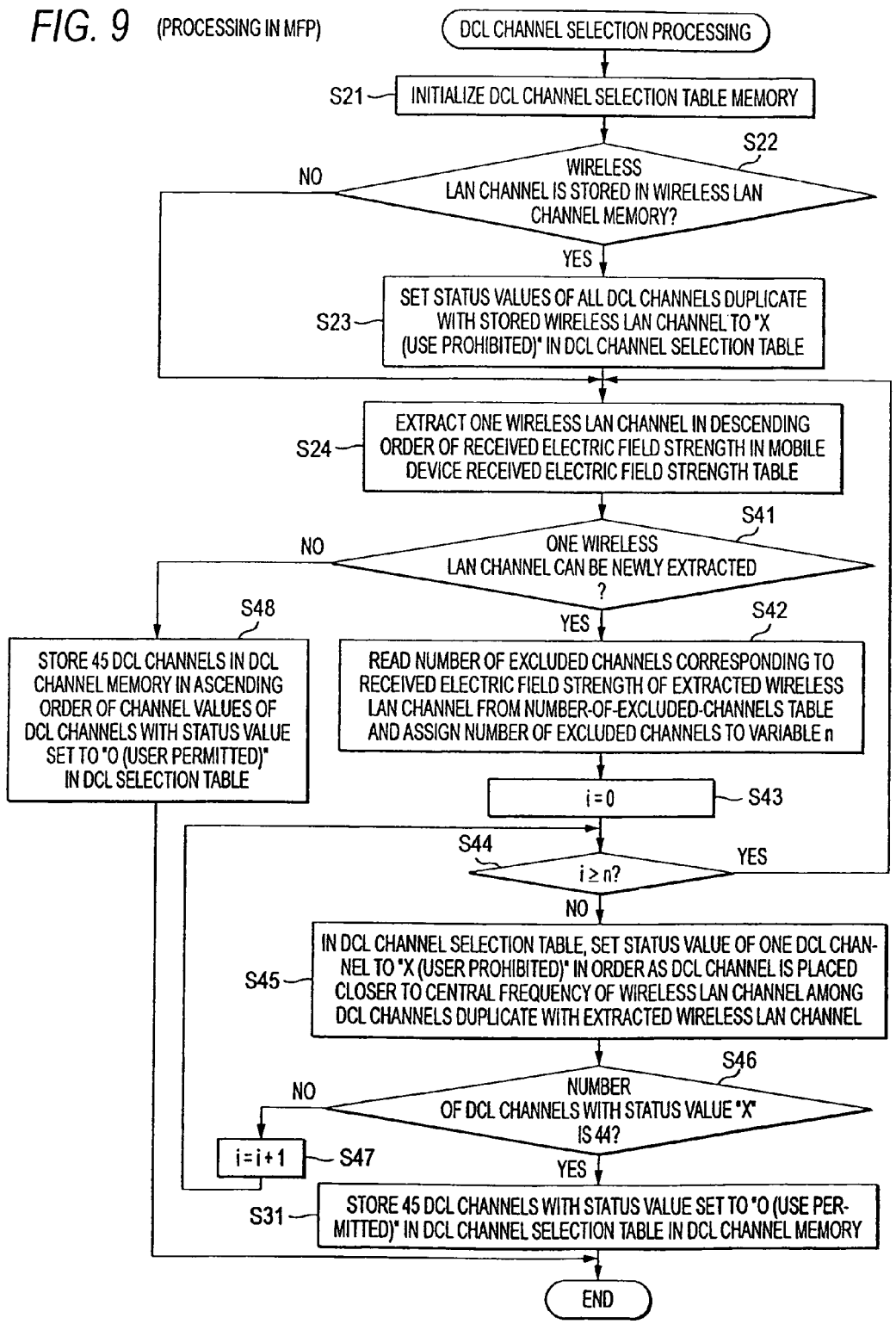

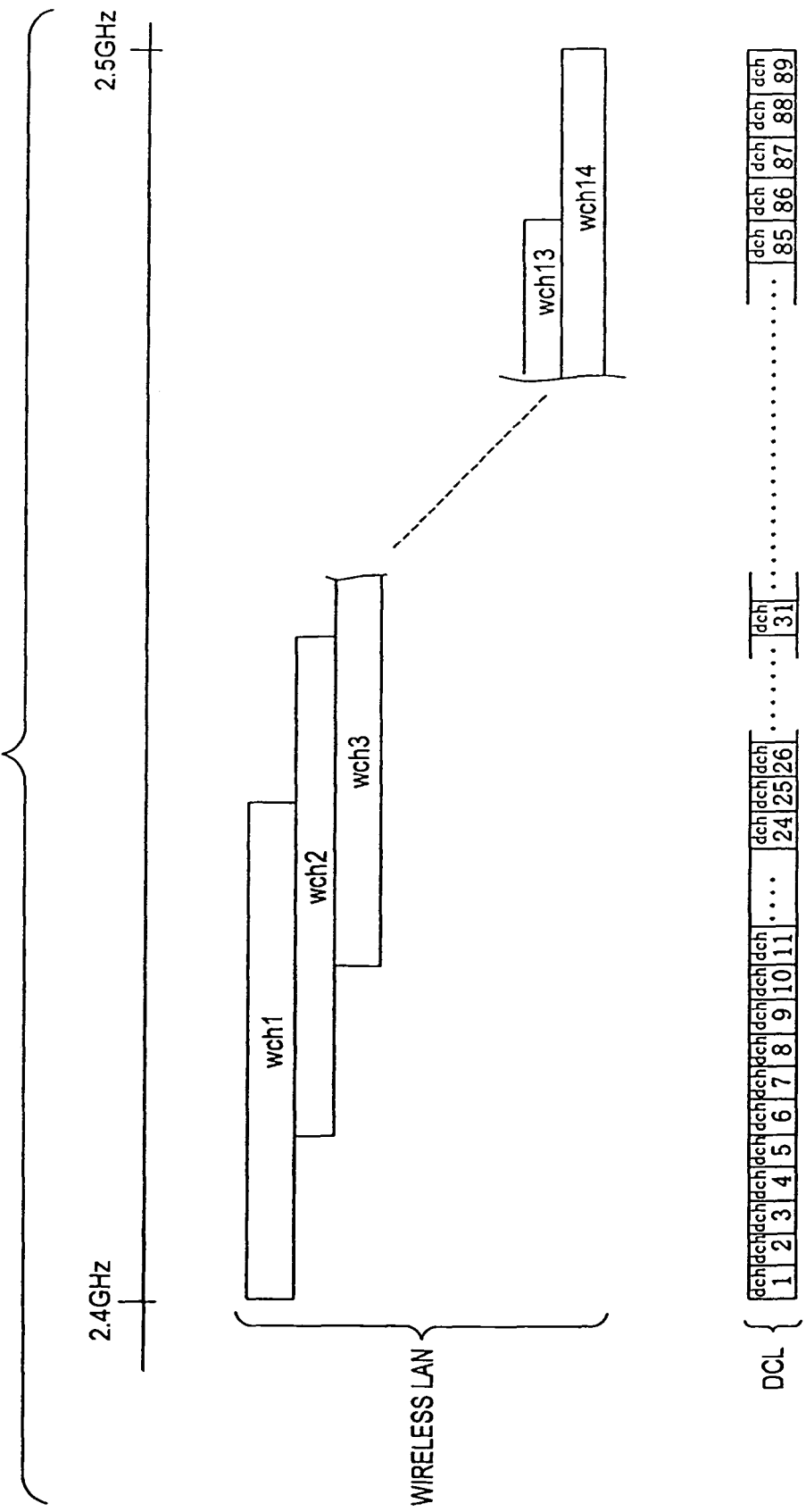

_US 8,213,952 B2_

COMMUNICATION SYSTEM

This application claims priority from Japanese Patent Application No. 2008-078631 filed on Mar. 25, 2008, the entire subject matter of which is incorporated herein by reference.

TECHNICAL FIELD

Aspects of the invention relate to a communication system.

BACKGROUND

There has been proposed a related art communication unit for conducting data communications and a telephone call using a predetermined frequency band. The related art communication unit uses the same frequency band for data communications and a telephone call. For example, a wireless Local Area Network (LAN) intended for data communications and a digital codeless telephone (DCL) intended for a telephone call use the same frequency band of 2.4 GHz.

The frequency band and frequency channels used with the wireless LAN and the DCL will be discussed with reference to FIG. 10. FIG. 10 is a schematic drawing to show the frequency band and frequency channels used with the wireless LAN and the DCL.

As shown in FIG. 10, each of the communication systems of the wireless LAN and the DCL uses the communication band of 2.4 GHz to 2.5 GHz (2.4 GHz band). Channels into which the frequency band is divided are set corresponding to the communication systems of the wireless LAN and the DCL. To distinguish the channels in the communication system of the wireless LAN from those in the communication system of the DCL, hereinafter the channels used with the wireless LAN will be referred to as wireless LAN channels and the channels used with the DCL will be referred to as DCL channels.

In the wireless LAN, the communication band of 2.4 GHz to 2.5 GHz is divided into 14 wireless LAN channels (wch1 to wch14). In the wireless LAN, one of the 14 wireless LAN channels is used continuously.

In the DCL, the communication band of 2.4 GHz to 2.5 GHz is divided into 89 DCL channels (dch1 to dch89). For each predetermined period called hopping period (for example, 1/100 seconds), the DCL channel to be used is changed among the preselected, for example, 45 DCL channels of the 89 DCL channels (hopping).

SUMMARY

Illustrative aspects of the invention provide a communication system that is capable of suppressing radio interference that wireless communications receive.

BRIEF DESCRIPTION OF THE DRAWINGS

FIG. 2 is a schematic drawing showing contents of a channel correspondence table;

FIG. 3A is a schematic drawing showing contents of a measurement point table, and FIG. 3B is a schematic drawing showing contents of a mobile device received electric field strength table;

FIG. 4B is a flowchart showing mobile device electric field strength measuring processing of the DCL mobile device;

FIGS. 6A and 6B are schematic drawings showing an example of the contents of a DCL channel selection table;

FIG. 7 is a schematic drawing showing an example of the contents of the DCL channel selection table;

FIG. 9 is a flowchart showing DCL channel selection processing of the MFP according to the second exemplary embodiment; and FIG. 10 is a schematic drawing showing frequency band and frequency channels used with a wireless LAN and a DCL.

DETAILED DESCRIPTION

General Overview

Figure 1:
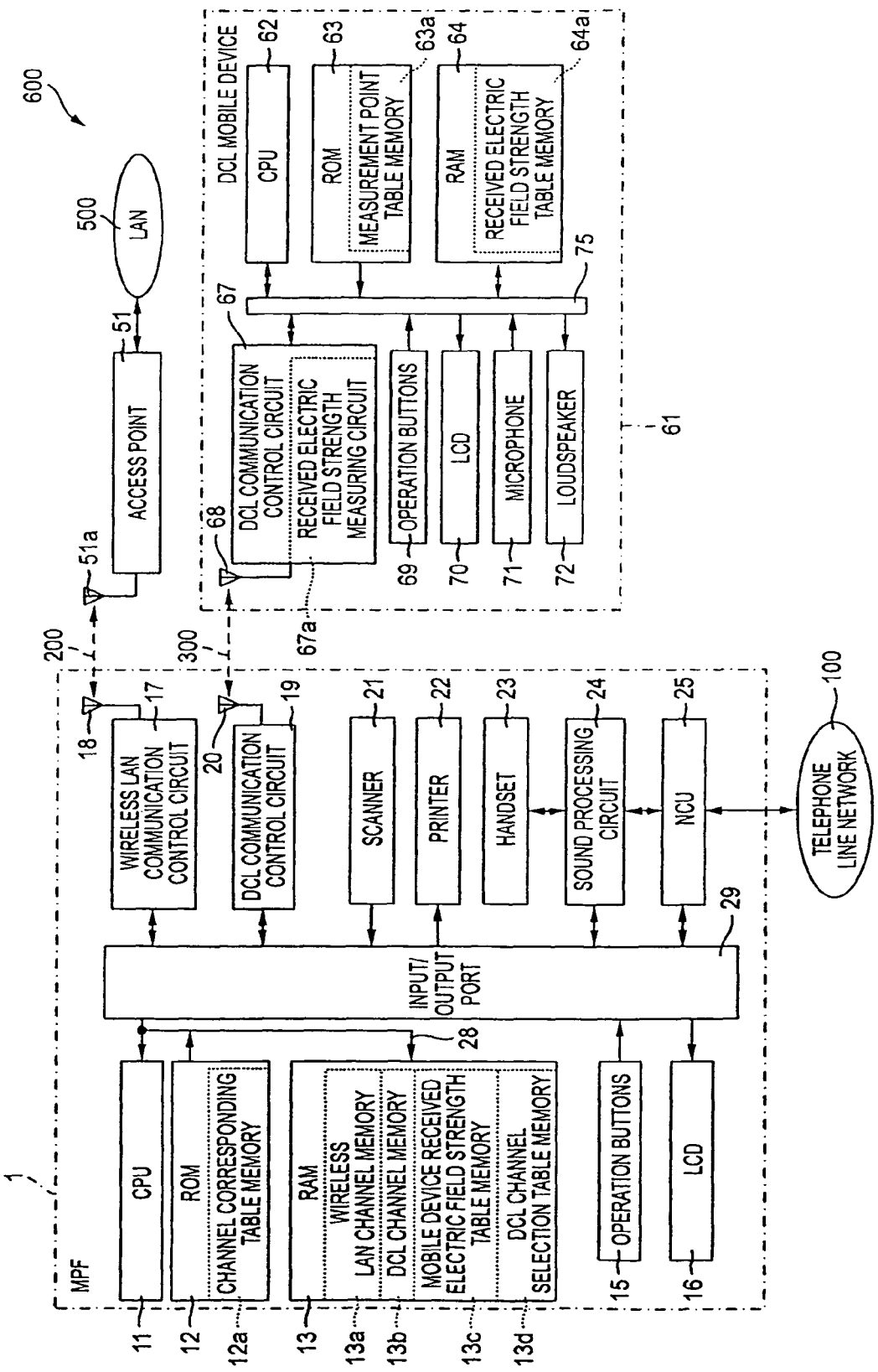
FIG. 1 is a block diagram showing an configuration of an MFP including a communication unit according to a first exemplary embodiment of the invention, an AP and a DCL mobile device.

The related art communication systems describe above have some disadvantages. For example, when the related art communication systems use the same frequency band under the circumstances where the two or more communication systems (i.e. the wireless LAN and the DCL) are mixed as described above, it is feared that radio interference may occur between the communication systems.

JP-A-2002-198867 discloses a technique for suppressing a communication error caused by the radio interference (see paragraph [0031], for example). That is, when wireless communications of a communication system using a plurality of wireless channels are conducted between two communication units (main communication unit and subcommunication unit), if the main communication unit detects radio interference exceeding a reference value for the wireless channel being used in the wireless communications, the main communication unit stops using the wireless channel so as to suppress a communication error caused by the radio interference.

However, in JP-A-2002-198867, if a plurality of wireless LAN channels and a plurality of DCL channels are used in the neighborhood of the two communication units, most of the wireless channels may receive radio interference. Therefore, there is a problem in that use of a large number of wireless channels is stopped, and it becomes difficult to conduct wireless communications.

Further, if the main communication unit gives a command of stopping a plurality of wireless channels, the wireless channels commanded to be stopped may contain a good wireless channel free of radio interference in the subcommunication unit. Thus, the subcommunication unit conducts communications using the wireless channel receiving the radio interference and therefore a communication error easily occurs in the subcommunication unit and it becomes difficult to conduct wireless communications with good communication quality between the main communication unit and the subcommunication unit.

Therefore, illustrative aspects of the invention provide a communication system that is capable of suppressing radio interference that wireless communications receive.

According to a first aspect of the invention, there is provided a communication system comprising: a main communication unit; a subcommunication unit that performs wireless communications with the main communication unit by using a plurality of first wireless channels, each of the plurality of first wireless channels indicating a respective band of a plurality of bands into which a predetermined frequency band is divided; and an external communication unit that performs wireless communications with the main communication unit by using a plurality of second wireless channels, each of the plurality of second wireless channels including a plurality of continuous first wireless channels in the predetermined frequency band, wherein the subcommunication unit comprises: a state detection unit that detects a use state of a part or all of the plurality of second wireless channels, and wherein the main communication unit comprises: a state acquisition unit that acquires the use state of a part or all of the plurality of second wireless channels detected by the state detection unit; a selection unit that selects a predetermined number of the first wireless channels with the less effect of radio wave interaction in the wireless communications performed between the main communication unit and the subcommunication unit from the plurality of first wireless channels based on the use state of a part or all of the plurality of second wireless channels acquired by the state acquisition unit; a channel determination unit that determines one of the predetermined number of the first wireless channels selected by the selection unit every first period; and a first wireless communication unit that performs wireless communications with the subcommunication unit using the one of the predetermined number of the first wireless channels determined by the channel determination unit.

According to a second aspect of the invention, in the communication system, wherein the state detection unit detects strength of a radio wave received in the band corresponding to the second wireless channel as the use state of a part or all of the plurality of second wireless channels, and wherein the selection unit comprises: a strong channel acquisition unit that acquires one of the plurality of second wireless channels in the descending order of the strength of the radio wave detected by the state acquisition unit; and a first excluding unit that excludes one of the plurality of continuous first wireless channels included in the second wireless channel acquired by the strong channel acquisition unit until a remaining number of the plurality of first wireless channels reaches the predetermined number, and wherein, when the first excluding unit excludes the one of the plurality of continuous first wireless channels, the selection unit selects the remained first wireless channels as the predetermined number of the first wireless channels with the less effect of radio wave interaction.

According to a third aspect of the invention, in the communication system, wherein, when the first excluding unit excludes the one of the plurality of continuous first wireless channels included in the second wireless channel, if the remaining number of the first wireless channels becomes less than the predetermined number, the first excluding unit preferentially excludes the first wireless channel positioned at the center of the band corresponding to the second wireless channel.

According to a fourth aspect of the invention, in the communication system, wherein the state detection unit detects strength of a radio wave received in the band corresponding to the second wireless channel as the use state of a part or all of the plurality of second wireless channels, and wherein the selection unit comprises: a strong channel acquisition unit that acquires one of the plurality of second wireless channels in the descending order of the strength of the radio wave detected by the state acquisition unit; and a second excluding unit that excludes a predetermined number of the plurality of continuous first wireless channels determined in accordance with the strength of the radio wave of the second wireless channel acquired by the strong channel acquisition unit until the number of first wireless channels reaches the predetermined number, the second excluding unit preferentially excluding the first wireless channel positioned at the center of the band corresponding to the second wireless channel, and wherein, when the second excluding unit excludes the one of the plurality of continuous first wireless channels, the selection unit selects the remained first wireless channels as the predetermined number of the first wireless channels with the less effect of radio wave interaction.

According to a fifth aspect of the invention, in the communication system, wherein the state detection unit detects strength of a radio wave received in the band corresponding to the second wireless channel as the use state of a part or all of the plurality of second wireless channels, and wherein the selection unit comprises: a weak channel acquisition unit that acquires one of the plurality of second wireless channels in the ascending order of the strength of the radio wave detected by the state acquisition unit; and an election unit that elects one of the plurality of continuous first wireless channels included in the second wireless channel acquired by the weak channel acquisition unit until the number of first wireless channels reaches the predetermined number, and wherein the selection unit selects the elected first wireless channels elected by the election unit as the predetermined number of the first wireless channels with the less effect of radio wave interaction.

According to sixth to eighth aspects of the invention, in the communication system, wherein the state detection unit detects the strength of the radio wave received at a substantially central frequency of the band corresponding to the second wireless channel as the use state of a part or all of the plurality of second wireless channels.

According to a ninth aspect of the invention, in the communication system, wherein the main communication unit further comprises: a second wireless communication unit that performs wireless communications with the external communication unit using one of the plurality of second wireless channels; and a second wireless channel acquisition unit that acquires the one of the plurality of second wireless channels used for the wireless communications with the external communication unit, wherein the selection unit comprises: a third excluding unit that excludes the plurality of continuous first wireless channels included in the one of the plurality of second wireless channels acquired by the second wireless channel acquisition unit from the plurality of first wireless channels, and wherein, when the third excluding unit excludes the plurality of continuous first wireless channels, the selection unit selects the predetermined number of the first wireless channels from the remained first wireless channels.

According to the aspects of the invention, in the subcommunication unit, the state detection unit detects the use state of each of the second wireless channels of wireless channels used for wireless communications by an external communication unit, each second wireless channel being made up of the continuous first wireless channels. In contrast, in the main communication unit, the state acquisition unit acquires the use state of the second wireless channel detected by the state detection unit, and the selection unit selects a predetermined number of the first wireless channels with the less effect of radio wave interaction in the wireless communications conducted between the main communication unit and the subcommunication unit from among the first wireless channels based on the use state. The channel determination unit determines one of the selected first wireless channels as many as the predetermined number every first period, and the first wireless communication unit conducts wireless communications with the subcommunication unit using the determined first wireless channel. Thus, the first wireless channels with the less effect of radio wave interaction are used in the wireless communications between the main communication unit and the subcommunication unit, so that the communication system has the advantage that it can suppress the radio interference that the wireless communications between the main communication unit and the subcommunication unit receive.

Since a predetermined number of the first wireless channels with the less effect of radio wave interaction are selected based on the use state of the second wireless channel detected by the state detection unit of the subcommunication unit, the communication system has the advantage that it can suppress the radio interference received by the subcommunication unit.

According to the second aspect of the invention, the state detection unit of the subcommunication unit detects the strength of a radio wave received in the band corresponding to the second wireless channel. In the selection unit of the main communication unit, the strong channel acquisition unit acquires the second wireless channel from among the second wireless channels in the descending order of the strength of the radio wave, the first excluding unit excludes the first wireless channels contained in the acquired second wireless channel until the remaining number of the first wireless channels becomes the predetermined number, and the first wireless channels remaining when the first excluding unit excludes the first wireless channels are set as the first wireless channels as many as the predetermined number with the less effect of radio wave interaction. Thus, the first wireless channels as many as the predetermined number can be selected as the first wireless channels contained in the second wireless channel having a high possibility of radio interference with the first wireless channels are avoided, so that the communication system has the advantage that it can suppress the radio interference that the wireless communications between the main communication unit and the subcommunication unit receive from the wireless communications conducted by the external communication unit even if the external communication unit conducts the wireless communications.

According to the third aspect of the invention, when the first excluding unit excludes the first wireless channels contained in the second wireless channel, if the remaining number of the first wireless channels becomes less than the predetermined number, the first excluding unit preferentially excludes the first wireless channel positioned at the center of the band corresponding to the second wireless channel. In general wireless communications, the frequency closer to the center of the band of the wireless channel is used more frequently for the wireless communications. Thus, the communication system has the advantage that it can decrease the possibility that the wireless communications between the main communication unit and the subcommunication unit may receive radio interference by preferentially excluding the first wireless channel positioned at the center of the band of the second wireless channel.

Particularly, if wireless communications according to spread spectrum are conducted in the external communication unit, the radio wave strength is higher at the frequency closer to the center in the band corresponding to the second wireless channel used for the wireless communications. Thus, the communication system has the advantage that it can furthermore suppress the radio interference that the wireless communications between the main communication unit and the subcommunication unit receive from the wireless communications conducted by the external communication unit.

According to the fourth aspect of the invention, in the selection unit of the main communication unit, the strong channel acquisition unit acquires the second wireless channel from among the second wireless channels in the descending order of the strength of the radio wave, the second excluding unit excludes the first wireless channels as many as the number determined in response to the strength of the radio wave of the acquired second wireless channel preferentially starting at the first wireless channel positioned at the center of the band corresponding to the second wireless channel, and the first wireless channels remaining when the second excluding unit excludes the first wireless channels are set as the first wireless channels as many as the predetermined number with the less effect of radio wave interaction. Thus, the first wireless channels contained in the second wireless channel are excluded as many as the number determined in response to the strength of the radio wave, so that in a predetermined frequency band, the first wireless channels are excluded in a distributed manner and are also left in a distributed manner. The second wireless channel used for the wireless communications by the external communication unit is made up of the continuous first wireless channels. Thus, to conduct wireless communications between the main communication unit and the subcommunication unit, the possibility that the second wireless channel may overlap with one first wireless channel can be more decreased by using the first wireless channels left in a distributed manner rather than the first wireless channels left in an aggregated manner. Therefore, according to the fourth aspect of the invention, in a predetermined frequency band, the first wireless channels are excluded in a distributed manner and are also left in a distributed manner. Thus, the communication system has the advantage that it can decrease the possibility of receiving radio interference from the wireless communications conducted by the external communication unit.

If wireless communications according to spread spectrum are conducted in the external communication unit, the radio wave strength is higher at the frequency closer to the center in the band corresponding to the second wireless channel used for the wireless communications. Thus, the communication system has the advantage that it can decrease the possibility that the wireless communications between the main communication unit and the subcommunication unit may receive radio interference from the wireless communications conducted by the external communication unit by preferentially excluding the first wireless channel positioned at the center of the band of the second wireless channel. Further, the communication system has the advantage that it can ensure the first wireless channels as many as the predetermined number while avoiding the first wireless channels having a high possibility receiving radio interference if two or more second wireless channels where the radio wave strength is strong exist and are across the most of a predetermined frequency band.

According to the fifth aspect of the invention, in the selection unit of the main communication unit, the weak channel acquisition unit acquires the second wireless channel from among the second wireless channels in the ascending order of the strength of the radio wave. The selecting unit selects the first wireless channels contained in the acquired second wireless channel until the number of first wireless channels reaches the predetermined number, and the first wireless channels selected by the selecting unit are selected as the first wireless channels as many as the predetermined number with the less effect of radio wave interaction. Therefore, wireless communications can be conducted between the main communication unit and the subcommunication unit using the first wireless channels as many as the predetermined number selected in order starting at the first wireless channel contained in the second wireless channel where the radio wave strength is weak. Thus, the communication system has the advantage that it can suppress the radio interference that the wireless communications between the main communication unit and the subcommunication unit receive from the wireless communications conducted by the external communication unit even if the external communication unit conducts the wireless communications.

According to the sixth to eighth aspects of the invention, the state detection unit of the subcommunication unit detects the strength of a radio wave received at the central frequency of the band corresponding to the second wireless channel or at a frequency in the proximity of the central frequency. Thus, the number of detection parts can be made smaller than that when the radio wave strength in the whole band corresponding to the second wireless channel is detected, and the radio wave strength can be detected in a short time. Therefore, the communication system has the advantage that it can shorten the time from detection of the state detection unit to selection of the first wireless channels as many as the predetermined number by the selecting unit.

According to the ninth aspect of the invention, in the main communication unit, the second wireless communication unit conducts wireless communications with the external communication unit using the second wireless channel, and the second wireless channel acquisition unit acquires the second wireless channel used for the wireless communications by the second wireless communication unit. The third excluding unit excludes the first wireless channel contained in the acquired second wireless channel from the first wireless channels, and the first wireless channels as many as the predetermined number are selected from among the first wireless channels remaining when the first wireless channel is excluded. Thus, the communication system has the advantage that it can suppress the radio interference that the wireless communications between the main communication unit and the subcommunication unit receive from the wireless communications conducted by the second wireless communication unit even if the wireless communications are conducted between the main communication unit and the external communication unit.

EXEMPLARY EMBODIMENTS

Exemplary embodiments of the invention will now be described with reference to the drawings.

First Exemplary Embodiment

FIG. 1 is a block diagram of a communication system 600 according to an exemplary embodiment of the invention. The communication system 600 includes a multiple function peripheral (MFP) 1 (one example of a main communication unit) according to a first exemplary embodiment of the invention, an access point (AP) 51 (one example of an external communication unit) and a DCL mobile device 61 (one example of a subcommunication unit). The MFP 1 and the AP 51 can conduct data communications with each other through wireless communications 200. The MFP 1 (main device) and the DCL mobile device 61 enable the user to make a telephone call through wireless communications 300.

The MFP 1 of the exemplary embodiment selects, for example, 45 DCL channels with suppressed radio interference with wireless LAN channels (wch1 to wch14) being used in the neighborhood of the DCL mobile device 61 among 89 DCL channels (dch1 to dch89) (one example of a first wireless channel) provided in a 2.4 GHz band (2.4 GHz to 2.5 GHz), and conducts the wireless communications 300 with the DCL mobile device 61.

Next, the electric configuration of the MFP 1 will be discussed. The MFP 1 mainly has a CPU 11, ROM 12, RAM 13, operation buttons 15, an LCD 16, a wireless LAN communication control circuit 17 (one example of a second wireless communication unit), a digital cordless communication control circuit (DCL communication control circuit) 19, a scanner 21, a printer 22, a handset 23, a sound processing circuit 24, and an NCU 25.

The CPU 11, the ROM 12, and the RAM 13 are connected through a bus line 28. The handset 23 and the NCU 25 are connected to the sound processing circuit 24. Further, the operation buttons 15, the LCD 16, the wireless LAN communication control circuit 17, the DCL communication control circuit 19, the scanner 21, the printer 22, the sound processing circuit 24, the NCU 25, and the bus line 28 are connected through an input/output port 29.

The CPU 11 is an arithmetic unit for controlling the functions of the MFP 1 and the units connected to the input/output port 29 in accordance with fixed values and programs stored in the ROM 12 and the RAM 13 or various signals transmitted and received through the wireless LAN communication control circuit 17, the DCL communication control circuit 19, or the NCU 25.

Figure 4A:
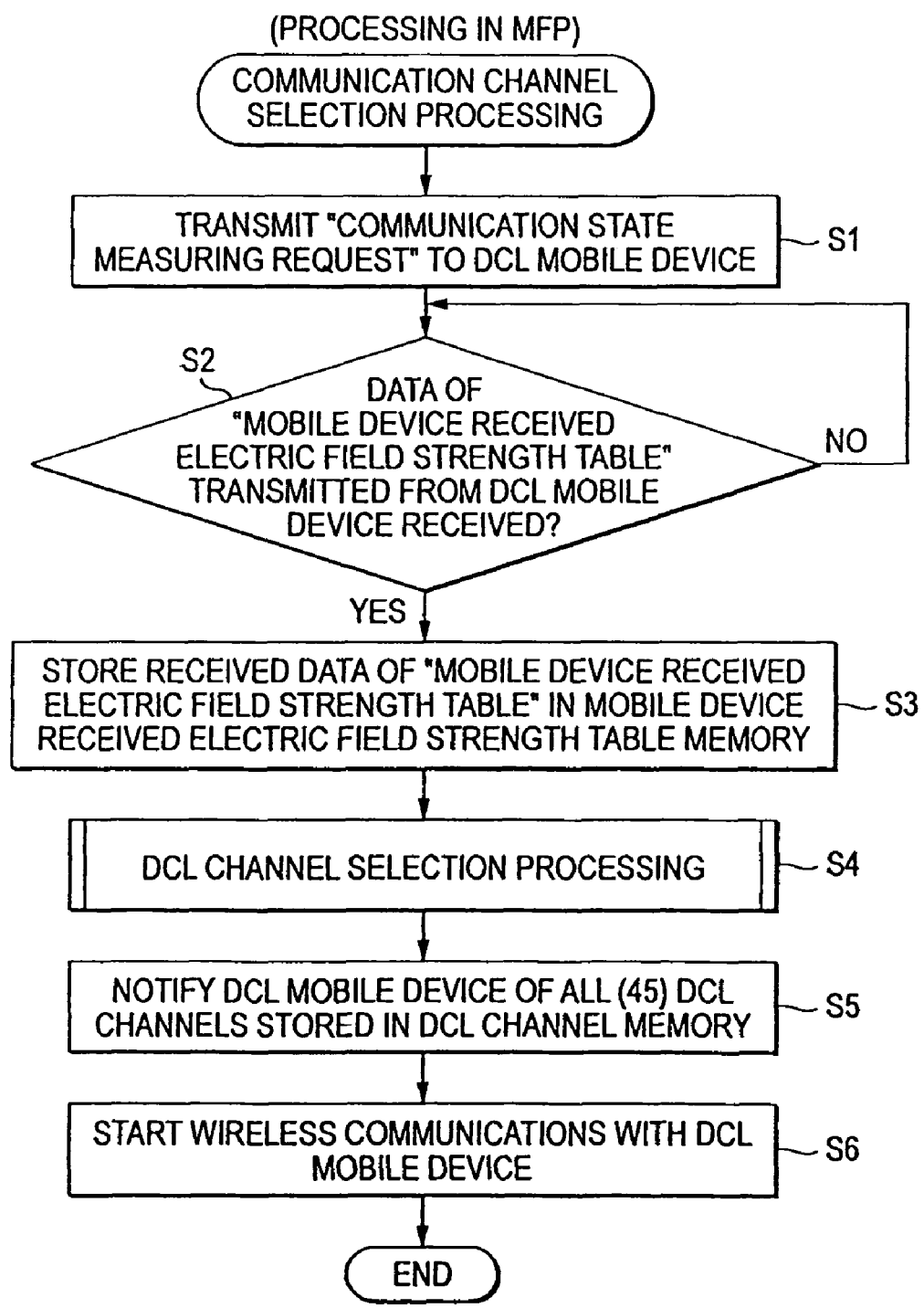
FIG. 4A is a flowchart showing communication channel selection processing of the MFP.
Figure 5:
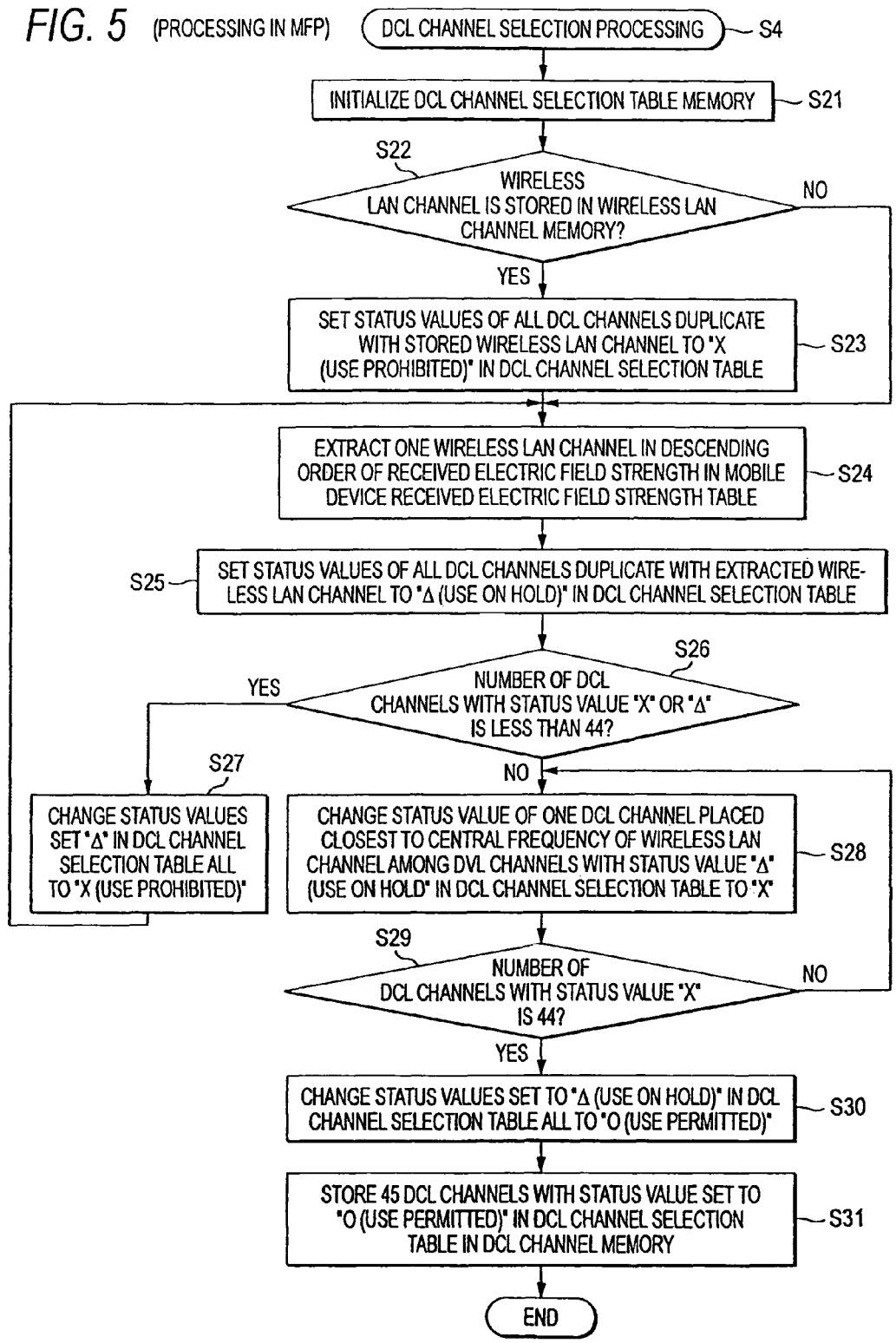
FIG. 5 is a flowchart showing DCL channel selection processing of the MFP.

The ROM 12 is rewritable non-volatile memory storing a control program, etc., executed in the MFP 1. Programs for executing communication channel selection processing shown in a flowchart of FIG. 4A and DCL channel selection processing shown in a flowchart of FIG. 5 are stored in the ROM 12.

The ROM 12 includes channel correspondence table memory 12a. This channel correspondence table memory 12a is memory for storing a channel correspondence table indicating a correspondence relationship between the wireless LAN channels (wch1 to wch14) and the DCL channels (dch1 to dch89).

The channel correspondence table will be discussed with FIG. 2. FIG. 2 is a schematic drawing showing the contents of the channel correspondence table. The channel correspondence table is made up of the wireless LAN channels and the DCL channels, wherein each wireless LAN channel is associated with all the DCL channels which frequency band overlaps with the wireless LAN channel.

For example, the frequency band used with the wireless LAN channel "wch1" is overlapped with the frequency band used with the DCL channels "dch4 to dch25" and therefore the wireless LAN channel "wch1" is associated with the DCL channels "dch4 to dch25" in the channel correspondence table.

Likewise, the wireless LAN channel "wch2" is associated with the DCL channels "dch9 to dch30" and the wireless LAN channel "wch3" is associated with the DCL channels "dch15 to dch36." Each of other wireless LAN channels (wch4 to wch14) is also associated with all the DCL channels which frequency band overlaps with the wireless LAN channel in a similar manner to that described above.

Referring again to FIG. 1, the RAM 13 is rewritable volatile memory for temporarily storing various pieces of data at the execution time of operation of the MFP 1. The RAM 13 includes wireless LAN channel memory 13a, DCL channel memory 13b, mobile device received electric field strength table memory 13c, and DCL channel selection table memory 13d.

The wireless LAN channel memory 13a is memory for storing one wireless LAN channel used by the wireless LAN communication control circuit 17 for the wireless communications 200 with the AP 51. Although details are described later, one wireless LAN channel used for the wireless communications 200 is determined in the AP 51 and the AP 51 notifies the MFP 1 of the determined one wireless LAN channel. Upon reception of the notification of the one wireless LAN channel from the AP 51, the MFP 1 stores the wireless LAN channel in the wireless LAN channel memory 13a.

The DCL channel memory 13b is memory for storing, for example, 45 DCL channels used by the DCL communication control circuit 19 for the wireless communications 300 with a DCL communication control circuit 67 of the DCL mobile device 61. When DCL channel selection processing described later with reference to FIG. 5 is executed, for example, 45 DCL channels used for the wireless communications 300 are determined and are stored in the DCL channel memory 13b. The DCL mobile device 61 is notified of the determined DCL channels.

Although details are described later, the DCL communication control circuit 19 selects one DCL channel from among, for example, 45 DCL channels stored in the DCL channel memory 13b for each hopping period (for example, 1/100 seconds) and conducts the wireless communications 300 with the DCL mobile device 61.

The mobile device received electric field strength table memory 13c is memory for storing the received electric field strength of the wireless LAN channel (wch1 to wch14) measured in the DCL mobile device 61 for each wireless LAN channel.

When a "communication situation measuring request" is transmitted from the MFP 1 to the DCL mobile device 61 (see FIG. 4A), the DCL mobile device 61 starts mobile device electric field strength measuring processing (see FIG. 4B) and measures the received electric field strength of each wireless LAN channel. The received electric field strength means the strength of the radio wave received at the frequency to which measurement is applied (in this case, the central frequency of one wireless LAN channel, and is indicated by a value of 1 to 10. The closer to 1 the received electric field strength, the weaker the strength of the received radio wave; the closer to 10 the received electric field strength, the stronger the strength of the received radio wave.

The received electric field strength of each wireless LAN channel measured by the DCL mobile device 61 and a mobile device received electric field strength table of the measurement result will be discussed with reference to FIGS. 3A and 3B. FIG. 3A is a schematic drawing showing the contents of a measurement point table stored in measurement point table memory 63a of ROM 63 of the DCL mobile device 61. FIG. 3B is a schematic drawing showing the contents of the mobile device received electric field strength table stored in received electric field strength table memory 64a of RAM 64 of the DCL mobile device 61.

First, the received electric field strength of each wireless LAN channel measured by the DCL mobile device 61 will be discussed. As described above, upon reception of a "communication situation measuring request" transmitted from the MFP 1, the DCL mobile device 61 measures the received electric field strength of each wireless LAN channel in accordance with the measurement point table of the measurement point table memory 63a. As shown in FIG. 3A, the measurement point table is made up of the wireless LAN channels and measurement points (frequencies), wherein each wireless LAN channel is associated with the measurement point (the central frequency of the wireless LAN channel) corresponding to the wireless LAN channel.

For example, the wireless LAN channel "wch1" is associated with "2412 MHz" of the central frequency of the band corresponding to the wireless LAN channel "wch1." Likewise, the wireless LAN channel "wch2" is associated with "2417 MHz" of the central frequency of the wireless LAN channel "wch2," and the wireless LAN channel "wch14" is associated with "2484 MHz" of the central frequency of the wireless LAN channel "wch14." Each of other wireless LAN channels (wch3 to wch13) is also associated with the central frequency of the wireless LAN channel in a similar manner to that described above.

Therefore, when the received electric field strength of the wireless LAN channel "wch1" is measured in the DCL mobile device 61, the received electric field strength of the measurement point "2412 MHz" corresponding to the wireless LAN channel "wch1" is measured. For other wireless LAN channels (wch2 to wch14), the received electric field strength of the measurement point corresponding to each of the wireless LAN channels is measured in a similar manner to that described above.

Upon completion of measuring the received electric field strengths of the wireless LAN channels, the DCL mobile device 61 stores the mobile device received electric field strength table of the measurement result in the received electric field strength table memory 64a of the RAM 64 and transmits the measurement result (mobile device received electric field strength table) to the MFP 1. Upon reception of the measurement result (mobile device received electric field strength table) transmitted from the DCL mobile device 61, the MFP 1 stores the measurement result in the mobile device received electric field strength table memory 13c.

Next, the mobile device received electric field strength table will be discussed. FIG. 3B is a schematic drawing showing the contents of the mobile device received electric field strength table. The mobile device received electric field strength table is the measurement result of the received electric field strength measured by the DCL mobile device 61 as described above. The mobile device received electric field strength table is made up of the wireless LAN channels and the received electric field strengths, wherein each wireless LAN channel is associated with the received electric field strength of the measurement point corresponding to the wireless LAN channel.

For example, the wireless LAN channel "wch1" is associated with received electric field strength "7" measured at the measurement point of the wireless LAN channel "wch1." Each of other wireless LAN channels (wch2 to wch14) is also associated with the received electric field strength measured at the measurement point of the wireless LAN channel in a similar manner to that described above.

If the received electric field strength of one wireless LAN channel measured by the DCL mobile device 61 is "1," it means that no radio wave is received at the measurement point (central frequency) of the wireless LAN channel. That is, the possibility that the measured wireless LAN channel may be unused for wireless communications in the neighborhood of the DCL mobile device 61 is high.

In contrast, if the received electric field strength of one wireless LAN channel measured by the DCL mobile device 61 is "10," it means that a very strong radio wave is received at the measurement point of the wireless LAN channel. Specifically, under a situation where the measured wireless LAN channel is used for the wireless communications 200 in the neighborhood of the DCL mobile device 61, when a DCL channel, which band overlaps with a band of the measured wireless LAN channel, is used for the wireless communications 300 between the MFP 1 and the DCL mobile device 61, radio interference occurs. Thus, it becomes difficult to make a telephone call. For other received electric field strengths ("2" to "9"), the interval between the received electric field strengths "1" and "10" is equally separated.

Referring again to FIG. 1, the DCL channel selection table memory 13$d$ is memory for storing a DCL channel selection table. The DCL channel selection table is a table used in the DCL channel selection processing described later with reference to FIG. 5; it is a table for selecting, for example, 45 DCL channels with suppressed radio interference with the wireless LAN channels (wch1 to wch14) being used in the neighborhood of the DCL mobile device 61 among the DCL channels (dch1 to dch89).

The DCL channel selection table is made up of the DCL channels and status values each indicating whether or not to use the corresponding DCL channel for the wireless communications 300, wherein each DCL channel is associated with the status value corresponding to the DCL channel.

The status value is a value indicating whether or not to use the associated DCL channel for the wireless communications 300 between the MFP 1 and the DCL mobile device 61 and is any of a value indicating use prohibited (for example, "−1"), a value indicating use on hold (for example, "0") or a value indicating use permitted (for example, "1"). For easy understanding, hereinafter, the status value indicating use prohibited will be called "X," the status value indicating use on hold will be called "Δ," and the status value indicating use permitted will be called "○."

Although details are described later, when the DCL channel selection processing (see FIG. 5) is executed, first the status values of all the 89 DCL channels are set to "○" in the DCL channel selection table (S21). The status values of the 44 DCL channels are set to "X" in order starting at the DCL channel receiving strong radio interference. This means that the 45 DCL channels with the status value "○" are selected by performing the processing. The values of the 45 DCL channels selected by performing the processing are stored in the DCL channel memory 13$b$ of the RAM 13 and are also sent to the DCL mobile device 61.

The operation buttons 15 include buttons to set functions of a wireless communication function of the wireless LAN, a wireless communication function of the DCL, a print function, etc., input buttons to enter various operation commands, numeric buttons to enter a telephone number, and the like. The LCD 16 is a display device to display a menu, the operation state, etc., in response to operation of the operation button 15. The user operates any of the operation buttons 15, whereby information corresponding to the operation is displayed on the LCD 16.

The wireless LAN communication control circuit 17 has a wireless LAN antenna 18 and is a known circuit for transmitting and receiving a digital signal to form data while conducting the wireless communications 200 according to a spread spectrum communication system with the AP 51. The radio wave strength is higher at the frequency closer to the central frequency in the band indicated by one wireless LAN channel used for the wireless communications 200.

The wireless LAN communication control circuit 17 conducts the wireless communications 200 with the AP 51 using the wireless LAN channel reported from the AP 51. Upon reception of the wireless LAN channel reported from the AP 51, the MFP 1 stores the wireless LAN channel value in the wireless LAN channel memory 13$a$. The wireless LAN channel used for the wireless communications 200 with the AP 51 is determined or changed by the AP 51 in response to the state of radio interference, etc. If the wireless communications 200 with the AP 51 terminate or the wireless communications 200 are not conducted, the channel value stored in the wireless LAN channel memory 13$a$ is cleared (deleted).

The DCL communication control circuit 19 has a DCL antenna 20 and is a circuit for transmitting and receiving a digital signal (sound data) to form sound of a telephone call while conducting the wireless communications 300 with the DCL communication control circuit 67 of the DCL mobile device 61.

The wireless communications 300 are conducted between the DCL communication control circuit 19 and the DCL communication control circuit 67 of the DCL mobile device 61 according to frequency hopping for changing the DCL channel used for the wireless communications 300 for each hopping period (for example, 1/100 seconds). The DCL channel used for the wireless communications 300 is selected from among the 45 DCL channels stored in the DCL channel memory 13$b$ of the RAM 13.

The scanner 21 reads an image from a document set at a predetermined read position (not shown), displays the image on the LCD 16, and generates image data printable on the printer 22. The image data read through the scanner 21 is stored in a predetermined storage area of the RAM 13.

The printer 22 is implemented as an ink jet printer for printing an image on a record sheet set at a predetermined sheet feed position (not shown). The printer 22 includes a print head using ink of four colors of C (cyan), M (magenta), Y (yellow), and K (black), a sheet feed unit, and a recovery unit for performing color print. The print head includes a plurality of nozzles (ink ejection ports) and while ink is ejected from the nozzles, a record sheet is fed by the sheet feed unit and an image is printed on the record sheet.

The handset 23 is a device for making a telephone call (telephone conversation) and has a microphone and a loudspeaker. The sound processing circuit 24 is a circuit for converting an analog sound signal into a digital signal and converting a digital signal into an analog sound signal; it converts a digital signal transmitted from the DCL mobile device 61 and received by the DCL communication control circuit 19 into an analog sound signal and outputs the analog sound signal to the handset 23 and the NCU 25.

The sound processing circuit 24 converts an analog sound signal output when a sound is input to the handset 23 and an analog sound signal received by the NCU 25 through a telephone line network 100 from an external apparatus (not shown) into a digital signal (sound data) and outputs the digital signal to the DCL communication control circuit 19. The digital signal (sound data) input to the DCL communication control circuit 19 is transmitted to the DCL mobile device 61 through the wireless communications 300.

The NCU 25 is connected to the telephone line network 100 and controls a telephone call with an external apparatus (not shown) by sending a dial signal to the telephone line network 100 and responding to a call signal from the telephone line network 100.

Next, the electric configuration of the AP 51 will be discussed. The AP 51 is connected to a LAN 500 and is a repeater having a known circuit for connecting a terminal connected through the wireless communications 200 (communication unit connected to the AP 51) to the LAN 500.

The AP 51 has a wireless LAN antenna 51$a$ and is adapted to be able to conduct the wireless communications 200 with the wireless LAN communication control circuit 17 of the MFP 1. A plurality of terminals including the MFP 1 can be connected to the AP 51 at the same time, and the terminals connected to the AP 51 (the MFP 1 and other communication units (not shown)) are connected to the LAN 500.

Next, the electric configuration of the DCL mobile device 61 will be discussed. The DCL mobile device 61 is a device for making a telephone call with the MFP 1 and an external apparatus (not shown) connected through the telephone line network 100 through the wireless communications 300 conducted with the MFP 1.

The DCL mobile device 61 mainly has a CPU 62, ROM 63, RAM 64, the DCL communication control circuit 67, operation buttons 69, an LCD 70, a microphone 71, and a loudspeaker 72. The CPU 62, the ROM 63, the RAM 64, the DCL communication control circuit 67, the operation buttons 69, the LCD 70, the microphone 71, and the loudspeaker 72 are connected through a bus line 75.

The CPU 62 controls the units connected by the bus line 75 in accordance with fixed values and programs stored in the ROM 63 and the RAM 64 or various signals transmitted and received through the DCL communication control circuit 67. The ROM 63 is unrewritable memory storing various control programs executed in the DCL mobile device 61. A program for executing mobile device electric field strength measuring processing shown in a flowchart of FIG. 4B is stored in the ROM 63.

The ROM 63 includes the above-mentioned measurement point table memory 63a. The measurement point table previously described with reference to FIG. 3A is stored in the measurement point table memory 63a.

The RAM 64 is rewritable memory for temporarily storing various pieces of data. The RAM 64 includes the above-mentioned received electric field strength table memory 64a. The mobile device received electric field strength table previously described with reference to FIG. 3B is stored in the received electric field strength table memory 64a. When the mobile device electric field strength measuring processing (see FIG. 4B) is executed in the DCL mobile device 61, the received electric field strength of each wireless LAN channel is measured and the mobile device received electric field strength table of the measurement result is stored in the received electric field strength table memory 64a.

The DCL communication control circuit 67 has a DCL antenna 68 and is a known circuit for conducting the wireless communications 300 with the DCL communication control circuit 19 of the MFP 1 for making it possible to conduct data communications with the MFP 1 and transmit and receive a sound signal, etc., to and from the MFP 1.

The DCL communication control circuit 67 has the DCL antenna 68 and is a known circuit for transmitting and receiving a digital signal forming a sound (voice) of a telephone call (telephone conversation) while conducting the wireless communications 300 with the DCL communication control circuit 19 of the MFP 1 of the main device. The DCL communication control circuit 67 conducts the wireless communications 300 with the MFP 1 according to the frequency hopping using the 45 DCL channels reported from the DCL communication control circuit 19 of the MFP 1. The 45 DCL channels reported from the DCL communication control circuit 19 of the MFP 1 are stored in a predetermined storage area of the RAM 64, for example.

The DCL communication control circuit 67 includes a received electric field strength measuring circuit 67a (one example of a state detection unit). This received electric field strength measuring circuit 67a is a known circuit for measuring the received electric field strength at the frequency to be measured (specified frequency).

The operation buttons 69 include various buttons such as numeric buttons to enter a telephone number. The LCD 70 is a display device to display an operation sequence, the operation state, the telephone call (telephone conversation) state, etc., of the DCL mobile device 61.

The microphone 71 converts an input sound into a sound signal and outputs the sound signal. When the MFP 1 is connected to an external apparatus (not shown) through the telephone line network 100 (see FIG. 2) in a conversation-possible manner, the user can make telephone conversation with the external apparatus using the DCL mobile device 61. Voice produced by the user is converted through the microphone 71 into a sound signal and the sound signal is transmitted to the external apparatus through the wireless communications 300 and the telephone line network 100.

The loudspeaker 72 converts an input sound signal into a sound and outputs the sound; it outputs an audible alert when an error occurs, a ringing tone responsive to an incoming call from an external apparatus through the telephone line network 100, a sound based on a sound signal transmitted from an external apparatus, and the like.

Next, the communication channel selection processing executed by the CPU 11 of the MFP 1 will be discussed with reference to FIG. 4A. FIG. 4A is a flowchart to show the communication channel selection processing of the MFP 1.

The communication channel selection processing is processing to start the wireless communications 300 between the DCL communication control circuit 19 and the DCL mobile device 61 and is processing executed when a telephone call is started between the MFP 1 and the DCL mobile device 61 or between an external apparatus (not shown) connected to the telephone line network 100 and the DCL mobile device 61.

In the communication channel selection processing, first a "communication state measuring request" is transmitted to the DCL mobile device 61 (S1). Although details are described later with reference to FIG. 4B, upon reception of the "communication state measuring request" transmitted from the MFP 1, the DCL mobile device 61 measures the received electric field strength of each of the wireless LAN channels (wch1 to wch14) and transmits data of the "mobile device received electric field strength table" of the measurement result to the MFP 1.

Next, whether or not data of the "mobile device received electric field strength table" transmitted from the DCL mobile device 61 is received is determined (S2) and a wait mode is entered until reception of data of the "mobile device received electric field strength table" (NO at S2). In contrast, if data of the "mobile device received electric field strength table" transmitted from the DCL mobile device 61 is received (YES at S2), the received data of the "mobile device received electric field strength table" is stored in the mobile device received electric field strength table memory 13c of the RAM 13 (S3) and DCL channel selection processing is executed (S4). Incidentally, S1 and S2 are example of a state acquisition unit.

Although details are described later with reference to FIG. 5, the DCL channel selection processing (S4) is processing of selecting, for example, 45 DCL channels with suppressed radio interference with the wireless LAN channels (wch1 to wch14) being used in the neighborhood of the DCL mobile device 61 among the 89 DCL channels (dch1 to dch89). When the DCL channel selection processing (S4) is executed, the selected, for example, 45 DCL channels are stored in the DCL channel memory 13b of the RAM 13.

Next, the DCL mobile device 61 is notified of all (45) DCL channels stored in the DCL channel memory 13b of the RAM 13 (S5) and the wireless communications 300 with the DCL mobile device 61 are started (S6) and the communication channel selection processing is terminated.

Next, the mobile device electric field strength measuring processing executed by the CPU 62 of the DCL mobile device 61 will be discussed with reference to FIG. 4B. FIG. 4B is a flowchart to show the mobile device electric field strength measuring processing of the DCL mobile device 61.

The mobile device electric field strength measuring processing is processing to measure the received electric field strength of each of the wireless LAN channels (wch1 to wch14) in the DCL mobile device 61 and is processing executed upon reception of the "communication state measuring request" transmitted from the MFP 1.

In the mobile device electric field strength measuring processing, first the received electric field strength measuring circuit 67a of the DCL communication control circuit 67 measures the received electric field strengths of all the wireless LAN channels (wch1 to wch14) (S11). Specifically, the measurement point table in the measurement point table memory 63a is referenced and the measurement points corresponding to the wireless LAN channels (wch1 to wch14) to be measured (the central frequencies of the wireless LAN channels) are acquired. The received electric field strength measuring circuit 67a measures the received electric field strength at each measurement point.

For example, to measure the received electric field strength of the wireless LAN channel "wch1," the measurement point "2412 MHz" of the wireless LAN channel "wch1" is acquired and the received electric field strength measuring circuit 67a measures the received electric field strength at the frequency "2412 MHz."

Next, data of the mobile device received electric field strength table of the measurement results of the received electric field strengths of the wireless LAN channels (wch1 to wch14) is stored in the received electric field strength table memory 64a of the RAM 64 (S12). The data of the mobile device received electric field strength table stored in the received electric field strength table memory 64a of the RAM 64 is transmitted to the MFP 1 (S13) and the mobile device electric field strength measuring processing is terminated.

As the mobile device electric field strength measuring processing described above with reference to the flowchart of FIG. 4B is performed, if the "communication state measuring request" transmitted from the MFP 1 is received, the DCL mobile device 61 can measure the received electric field strengths of the wireless LAN channels (wch1 to wch14) and can transmit the measurement results to the MFP 1.

In the processing, only the received electric field strength at the central frequency of each of the wireless LAN channels (wch1 to wch14) is measured, so that the measurement can be accomplished in a shorter time than that when the received electric field strength in the whole band of each of the wireless LAN channels is measured. Thus, the measurement result can be rapidly transmitted to the MFP 1, so that 45 DCL channels can be selected faster in the MFP 1 and the wireless communications 300 between the MFP 1 and the DCL mobile device 61 can be started faster in the newly selected DCL channels.

Next, the DCL channel selection processing (S4) executed by the CPU 11 of the MFP 1 will be discussed with reference to FIGS. 5 to 7. FIG. 5 is a flowchart to show the DCL channel selection processing (S4) of the MFP 1. FIGS. 6 and 7 are schematic drawings showing examples of the contents of the DCL channel selection table stored in the DCL channel selection table memory 13d.

The DCL channel selection processing (S4) is processing of selecting, for example, 45 DCL channels with suppressed radio interference with the wireless LAN channels (wch1 to wch14) being used in the neighborhood of the DCL mobile device 61 from among the 89 DCL channels (dch1 to dch89).

In the DCL channel selection processing (S4), first the DCL channel selection table memory 13d of the RAM 13 is initialized (S21). Specifically, the status values of all (89) DCL channels are set to "○ (use permitted)" in the DCL channel selection table.

Next, whether or not a wireless LAN channel is stored in the wireless LAN channel memory 13a of the RAM 13 is determined (S22). If a wireless LAN channel is stored in the wireless LAN channel memory 13a, it means that the wireless communications 200 are conducted between the wireless LAN communication control circuit 17 and the AP 51. In contrast, if no wireless LAN channel is stored, it means that the wireless communications 200 are not conducted.

If a wireless LAN channel is stored in the wireless LAN channel memory 13a of the RAM 13 (YES at S22), the status values of all DCL channels overlap with the stored wireless LAN channel are set to "X (use prohibited)" in the DCL channel selection table of the DCL channel selection table memory 13d (S23). Incidentally, S22 and S23 are one example of a second wireless channel acquisition unit. Further, S23 is one example of a third excluding unit.

The case where the wireless LAN channel "wch3" is stored in the wireless LAN channel memory 13a will be discussed. First, the channel correspondence table of the channel correspondence table memory 12a is referenced, and the DCL channels overlapping with the wireless LAN channel "wch3" (dch15 to dch36) are acquired. As shown in FIG. 6A, the status values of the acquired DCL channels (dch15 to dch36) are set to "X (use prohibited)" in the DCL channel selection table. If any other wireless LAN channel (wch1 to wch14) is stored, processing is also performed in a similar manner to that described above.

If no wireless LAN channel is stored in the wireless LAN channel memory 13a of the RAM 13 (NO at S22), S23 is skipped and the process goes to S24.

Next, one wireless LAN channel is extracted in the descending order of the received electric field strength in the mobile device received electric field strength table of the mobile device received electric field strength table memory 13c (S24) (one example of a storing channel acquisition unit), and the status values of all DCL channels overlapping with the wireless LAN channel extracted at S24 are set to "Δ (use on hold)" in the DCL channel selection table of the DCL channel selection table memory 13d (S25).

Whether or not the number of DCL channels with the status value "X (use prohibited)" or "Δ (use on hold)" in the DCL channel selection table of the DCL channel selection table memory 13d is less than 44 is determined (S26).

If the number of DCL channels with the status value "X (use prohibited)" or "Δ (use on hold)" is less than 44 (YES at S26), the status values set to "Δ (use on hold)" in the DCL channel selection table of the DCL channel selection table memory 13d are all changed to "X (use prohibited)" (S27). In contrast, if the number of DCL channels with the status value "X (use prohibited)" or "Δ (use on hold)" is equal to or greater than 44 (NO at S26), the process goes to S28.

For example, if the contents of the mobile device received electric field strength table are as shown in FIG. 3B, the received electric field strength "8" is the strongest and therefore, first, the wireless LAN channel "wch8" is extracted. The channel correspondence table (see FIG. 2) of the channel correspondence table memory 12a is referenced, and the DCL channels overlapping with the wireless LAN channel "wch8" (dch42 to dch63) are acquired. As shown in FIG. 6B, first the status values of the acquired DCL channels (dch42 to dch63) are all set to "Δ (use on hold)" in the DCL channel selection table.

If the number of DCL channels with the status value "X" or "Δ" in the DCL channel selection table is less than 44, the status values of the acquired DCL channels (dch42 to dch63) are all set to "X (use prohibited)." In contrast, if the number of DCL channels with the status value "X" or "Δ" is equal to or greater than 44, the status values are not changed and S28 is executed.

At S28, in the DCL channel selection table of the DCL channel selection table memory 13d, the status value of one DCL channel placed closest to the central frequency of the wireless LAN channel among the DCL channels with the status value "Δ" is set to "X (use prohibited)."

To determine the channel placed closest to the central frequency of the wireless LAN channel will be explained. For example, before the status value is changed, the DCL channels with the status value "Δ (use on hold)" are arranged contiguously and thus both ends of the arrangement can be acquired. The DCL channel placed in the proximity of the center of the arrangement with the both ends as the reference is determined the channel placed closest to the central frequency.

Next, whether or not the number of DCL channels with the status value "X (use prohibited)" in the DCL channel selection table of the DCL channel selection table memory 13d is 44 is determined (S29). If the number of DCL channels with the status value "X (use prohibited)" is less than 44 (NO at S29), the process returns to S28 and the loop of S28 and S29 is repeated.

For example, if the contents of the DCL channel selection table are as shown in FIG. 6B, the DCL channel placed closest to the central frequency of the wireless LAN channel (in this case, wch8) among the DCL channels with the status value "Δ (use on hold)" (dch42 to dch63) is determined "dch52." Therefore, the status value of the DCL channel "dch52" is changed from "Δ (use on hold)" to "X (use prohibited)" as shown in FIG. 7.

If the number of DCL channels with the status value "X (use prohibited)" is less than 44, subsequently the status value of the DCL channel "dch53" placed next closest to the central frequency among the DCL channels with the status value "Δ (use on hold)" is changed from "Δ (use on hold)" to "X (use prohibited)" as shown in FIG. 7. After this, likewise, the above-described processing is repeated until the number of DCL channels with the status value "X (use prohibited)" reaches 44. Incidentally, S25 to S29 are one example of a first excluding unit.

If the number of DCL channels with the status value "X (use prohibited)" reaches 44 (YES at S29), the status values set to "Δ (use on hold)" in the DCL channel selection table of the DCL channel selection table memory 13d are all changed to "○ (use permitted)" (S30).

For example, as shown in FIG. 7, if the status values of the DCL channels "dch52" and "dch53" are changed from "Δ (use on hold)" to "X (use prohibited)," when the number of DCL channels with the status value "X (use prohibited)" reaches 44, the status values of other DCL channels (dch42 to dch51 and dch54 to dch63) with the status value "Δ (use on hold)" are changed to "○ (use permitted)."

Next, the 45 DCL channels with the status value set to "○ (use permitted)" in the DCL channel selection table of the DCL channel selection table memory 13d are stored in the DCL channel memory 13b (S31) and the DCL channel selection processing is terminated.

As the DCL channel selection processing described above with reference to the flowchart of FIG. 5 is performed, the 45 DCL channels, which are not overlapped with the wireless LAN channel (wch1 to wch14) where the received electric field strength is strong, can be selected from among the 89 DCL channels (dch1 to dch89). Therefore, when a telephone call is conducted between the MFP 1 and the DCL mobile device 61 or between an external apparatus (not shown) connected to the telephone line network 100 and the DCL mobile device 61, degradation of the telephone call (telephone conversation) quality can be suppressed. Incidentally, the DCL channel selection processing (S21 to S31) shown in FIG. 5 is one example of a selection unit.

Since the received electric field strengths of the wireless LAN channels are measured in the DCL mobile device 61, the DCL channel with radio interference most suppressed in the DCL mobile device 61 is selected. Therefore, particularly, if the DCL mobile device 61 receives radio interference from any other communication unit, the radio interference can be decreased, so that the communication quality in the DCL mobile device 61 can be enhanced and the telephone call (telephone conversation) quality can be enhanced.

When the DCL channels corresponding to the wireless LAN channel are all excluded, if the number of excluded channels exceeds 44, the DCL channels are excluded in order starting at the DCL channel placed closest to the central frequency of the wireless LAN channel among the DCL channels corresponding to the wireless LAN channel. The radio wave strength is higher at the frequency closer to the central frequency in the band indicated by one wireless LAN channel in the wireless communications 200 as described above. Thus, the radio interference that the wireless communications 300 receive from the wireless communications 200 can be furthermore suppressed by excluding the DCL channels in order starting at the DCL channel placed closest to the central frequency of the wireless LAN channel.

To exclude 44 DCL channels from among the 89 DCL channels (dch1 to dch89), if the wireless communications 200 are already conducted between the wireless LAN communication control circuit 17 and the AP 51, first all DCL channels corresponding to the wireless LAN channel used by the wireless LAN communication control circuit 17 for the wireless communications 200 are excluded and then the DCL channels corresponding to the wireless LAN channel where the received electric field strength is strong are excluded. Therefore, when the wireless communications 200 are conducted between the MFP 1 and the AP 51, the radio interference that the wireless communications 300 receive from the wireless communications 200 can be suppressed.

Second Exemplary Embodiment

Next, an MFP 31 of a second exemplary embodiment of the invention will be discussed. To select, for example, 45 DCL channels used for the wireless communications 300 between the MFP 1 of the first exemplary embodiment and the DCL mobile device 61, the MFP 1 extracts one wireless LAN channel in the descending order of the received electric field strength and excludes all DCL channels corresponding to the extracted wireless LAN channel; the MFP 31 of the second exemplary embodiment extracts one wireless LAN channel in the descending order of the received electric field strength and excludes as many DCL channels as the number of DCL channels responsive to the received electric field strength from among the DCL channels corresponding to the extracted wireless LAN channel.

Figures 8A, 8B:
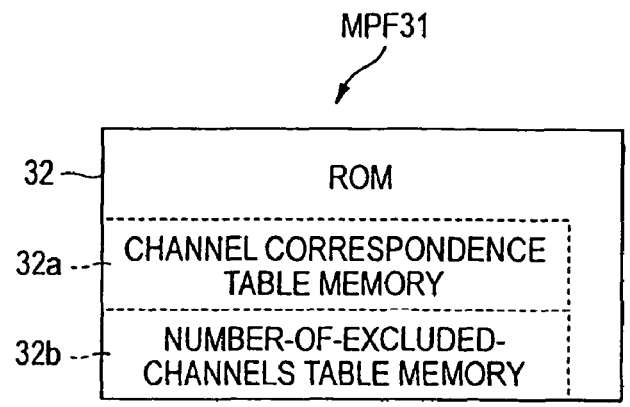
FIG. 8A is a partial block diagram showing a configuration of an MFP according to a second exemplary embodiment of the invention.
FIG. 8B is a schematic drawing showing contents of a number-of-excluded-channels table.

Next, the electric configuration of the MFP 31 will be discussed with reference to FIG. 8A. FIG. 8A is a block diagram to show the electric configuration of ROM 32 of the MFP 31. The electric configuration of the MFP 31 differs only in the ROM 32 from the electric configuration of the MFP 1 of the first exemplary embodiment previously described with reference to the block diagram (FIG. 1) and therefore only the ROM 32 will be discussed.

The ROM 32 is rewritable non-volatile memory storing a control program, etc., executed in the MFP 31. The program for executing the communication channel selection processing shown in the flowchart of FIG. 4A and a program for executing DCL channel selection processing according to the second exemplary embodiment shown in a flowchart of FIG. 9 are stored in the ROM 32.

The ROM 32 includes channel correspondence table memory 32a and number-of-excluded-channels table memory 32b. The channel correspondence table memory 32a has a similar data structure to that of the channel correspondence table memory 12a of the first exemplary embodiment and therefore will not be discussed again. The number-of-excluded-channels table memory 32b is memory for storing a number-of-excluded-channels table.

The number-of-excluded-channels table will be discussed with FIG. 8B. FIG. 8B is a schematic drawing showing the contents of the number-of-excluded-channels table. The number-of-excluded-channels table is made up of the received electric field strengths and the numbers of excluded channels, wherein each received electric field strength is associated with the number of excluded channels corresponding to the received electric field strength.

For example, as shown in FIG. 8B, the received electric field strength "10" and the number of excluded channels "10" are associated with each other. Likewise, the received electric field strength "9" and the number of excluded channels "8" are associated with each other and the received electric field strength "8" and the number of excluded channels "6" are associated with each other. Each of other received electric field strengths (7 to 1) is also associated with the number of excluded channels corresponding to the received electric field strength in a similar manner to that described above. The number-of-excluded-channels table is formed so that the number of excluded channels becomes smaller as the received electric field strength becomes weaker.

Next, the DCL channel selection processing executed by a CPU 11 of the MFP 31 according to the second exemplary embodiment will be discussed with reference to FIG. 9. FIG. 9 is a flowchart to show the DCL channel selection processing of the MFP 31 according to the second exemplary embodiment. Parts identical with those of the DCL channel selection processing in the first exemplary embodiment previously described with reference to FIG. 5 are denoted by the same reference numerals and will not be discussed again.

The DCL channel selection processing according to the second exemplary embodiment is processing of selecting 45 DCL channels with suppressed radio interference with wireless LAN channels (wch1 to wch14) being used in the neighborhood of a DCL mobile device 61 from among 89 DCL channels (dch1 to dch89).

In the DCL channel selection processing according to the second exemplary embodiment, first S21 to S23 are executed and one wireless LAN channel is extracted in the descending order of the received electric field strength in a mobile device received electric field strength table (see FIG. 3B) of mobile device received electric field strength table memory 13c (S24).

Next, whether or not one wireless LAN channel can be newly extracted at S24 is determined (S41). If one wireless LAN channel can be newly extracted (YES at S41), the number of excluded channels corresponding to the received electric field strength of the extracted wireless LAN channel is read from the number-of-excluded-channels table (see FIG. 8B) stored in the number-of-excluded-channels table memory 32b of the ROM 32, and the value is assigned to a variable n (S42). A variable i is initialized to 0 (S43) and whether or not the value of the variable i is equal to or greater than the value of the variable n is determined (S44).

If the value of the variable i is less than the value of the variable n (NO at S44), as many DCL channels as the read number of excluded channels are not excluded. Thus, in a DCL channel selection table of DCL channel selection table memory 13d, the status value of one DCL channel is set to "X (use prohibited)" in the order as the DCL channel is placed closer to the central frequency of the wireless LAN channel among the DCL channels overlapping with the wireless LAN channel extracted at S24 (S45).

Next, whether or not the number of DCL channels with the status value "X (use prohibited)" is 44 in the DCL channel selection table of the DCL channel selection table memory 13d is determined (S46). If the number of DCL channels with the status value "X (use prohibited)" is less than 44 (NO at S46), one is added to the variable i (S47) and the process returns to S44 and the steps S44 and S47 are repeated.

For example, when S24 is first executed, if the contents of a mobile device received electric field strength table are as shown in FIG. 3B, the received electric field strength "8" is the strongest and therefore, first, the wireless LAN channel "wch8" is extracted. The number-of-excluded-channels table of the number-of-excluded-channels table memory 32b is referenced and the number of excluded channels "6" corresponding to the received electric field strength "8" is acquired and is assigned to the variable n.

Next, 0 is assigned to the variable i and a comparison is made between the values of the variables i and n. Here, no DCL channel is yet excluded and therefore the status value of the DCL channel "dch52" placed closest to the central frequency of the wireless LAN channel among the DCL channels "dch42 to dch63" corresponding to the wireless LAN channel "wch8" is changed from "○ (use permitted)" to "X (use prohibited)." One is added to the variable i and again a comparison is made between the values of the variables i and n.

That is, the status value of one DCL channel at a time is changed from "○ (use permitted)" to "X (use prohibited)" in the order as the DCL channel is closer to the central frequency of the wireless LAN channel until the value of the variable i reaches the number of excluded channels "6." Therefore, if the value of the variable i is 1, the status value of the DCL channel "dch53" placed second closest to the central frequency among the DCL channels "dch42 to dch63" corresponding to the wireless LAN channel "wch8" is changed from "○ (use permitted)" to "X (use prohibited)." After this, the above-described processing is repeated in a similar manner.

If the number of DCL channels with the status value "X (use prohibited)" becomes 44 (YES at S46), the 45 DCL channels with the status value set to "○ (use permitted)" in the DCL channel selection table of the DCL channel selection table memory 13d are stored in DCL channel memory 13b (S31) and the DCL channel selection processing according to the second exemplary embodiment is terminated.

If the value of the variable i is equal to or greater than the value of the variable n (YES at S44), as many DCL channels as the read number of excluded channels are excluded in the DCL channel selection table of the DCL channel selection table memory 13d. Thus, the process returns to S24 and the steps S24 to S44 are repeated.

If one wireless LAN channel cannot be newly extracted (NO at S41) because all wireless LAN channels have already been extracted, the status values of the DCL channels exceeding 45 are set to "○ (use permitted)" in the DCL channel selection table of the DCL channel selection table memory 13d. Thus, the 45 DCL channels are stored in the DCL channel memory 13b in the ascending order of the channel values of the DCL channels (S48), and the DCL channel selection processing according to the second exemplary embodiment is terminated.

As the DCL channel selection processing according to the second exemplary embodiment with reference to the flowchart of FIG. 9 is performed, the 45 DCL channels with suppressed radio interference with the wireless LAN channels (wch1 to wch14) being used in the neighborhood of the DCL mobile device 61 can be selected from among the 89 DCL channels (dch1 to dch89). Incidentally, the DCL channel selection processing (S21 to S48) shown in FIG. 9 is one example of a selection unit.

Specifically, a wireless LAN channel is extracted in the descending order of the received electric field strength and as many DCL channels as the number of DCL channels responsive to the received electric field strength are excluded from among the DCL channels corresponding to the extracted wireless LAN channel. This means that the excluded DCL channels are distributed in the 89 DCL channels and thus the 45 DCL channels used for the wireless communications 300 are also distributed in the 89 DCL channels. Incidentally, S41 to S47 are one example of a second excluding unit.

Therefore, the possibility that the band of the 45 DCL channels used for the wireless communications 300 may be overlapped with the band of one wireless LAN channel is reduced, so that the possibility that the wireless communications 300 may receive radio interference from the wireless communications 200 can be reduced.

If a wireless LAN channel is extracted in the descending order of the received electric field strength, the DCL channels are excluded in order starting at the DCL channel placed closest to the central frequency of the wireless LAN channel among the DCL channels corresponding to the wireless LAN channel. The radiowave strength is higher at the frequency closer to the central frequency in the band indicated by one wireless LAN channel in the wireless communications 200 as described above. Thus, the radio interference that the wireless communications 300 receive from the wireless communications 200 can be furthermore suppressed by excluding the DCL channels in order starting at the DCL channel placed closest to the central frequency of the wireless LAN channel.

Particularly, if more than one wireless LAN channel with the strong received electric field strength exists, namely, if the wireless communications 200 use most of the 2.4 GHz band, as many DCL channels receiving most radio interference, namely, as many DCL channels placed in the proximity of the central frequency of each wireless LAN channel as the number of excluded channels responsive to the received electric field strength are excluded. Therefore, the 45 DCL channels used for the wireless communications 300 can be ensured while the DCL channels receiving strong radio interference are excluded.

(Modification to Exemplary Embodiments)

While the present invention has been shown and described with reference to certain exemplary embodiments thereof, it will be understood by those skilled in the art that various changes in form and details may be made therein without departing from the spirit and scope of the invention as defined by the appended claims. For example, the numeric values are given in the embodiments by way of example and other numeric values can be adopted, of course.

For example, the MFP 1 of the embodiment includes the wireless LAN communication control circuit 17 and the DCL communication control circuit 19, but may include a different communication control circuit for conducting wireless communications using the same frequency band as the DCL communication control circuit 19 (for example, a Bluetooth (registered trademark) communication control circuit) in place of the wireless LAN communication control circuit 17. Of course, the MFP 1 may include the wireless LAN communication control circuit 17, the different communication control circuit, and the DCL communication control circuit 19. Also in such a case, the DCL mobile device 61 includes a circuit for measuring the received electric field strength of each channel used for wireless communications by the different communication control circuit, whereby, for example, 45 DCL channels with suppressed radio interference with the channels used for wireless communications by the different communication control circuit can be selected. Thus, the radio interference that the wireless communications 200 receive from the wireless communications of the different communication control circuit can be suppressed The embodiment is intended for suppressing or decreasing the radio interference of wireless communications using a part or all of the 2.4 GHz band, but can also be applied to wireless communications using any other frequency band, such as a 5 GHz band or a 2.5 GHz band, for example.

In the embodiment, the wireless LAN communication control circuit 17 for conducting the wireless communications 200 according to direct spread is used, but a different wireless communication control circuit for conducting wireless communications according to spread spectrum may be used. For example, a wireless communication control circuit using frequency hopping of one example of spread spectrum or a hybrid system using the direct spread and the frequency hopping in combination or the like applies.

In the embodiment, the received electric field strength measured in the DCL mobile device 61 is used as the determination criterion of radio interference (communication state), but the DCL mobile device 61 may include a BER (bit error rate) detection circuit and the detected BER value may be adopted as the determination criterion of radio interference. For example, it can be determined that the lower the BER value, the weaker the radio interference and the higher the BER value, the stronger the radio interference. If the detection value of the BER detection circuit and the detection value of the received electric field strength measuring circuit 67a are used in combination as the determination criterion, the communication state can be determined with better accuracy.

In the embodiment, the received electric field strength is measured in the DCL mobile device 61, but the MFP 1 may also include a received electric field strength measuring circuit and the received electric field strength in the MFP and the received electric field strength in the DCL mobile device 61 may be measured. If, for example, 45 DCL channels are selected based on the received electric field strength using the values of the received electric field strength measured in the MFP and the received electric field strength measured in the DCL mobile device 61, the radio interference received in the MFP 1 and that in the DCL mobile device 61 can be suppressed. Therefore, if a telephone call is conducted between the MFP 1 and the DCL mobile device 61 or between an external apparatus (not shown) connected to the telephone line network 100 and the DCL mobile device 61, degradation of the telephone call (telephone conversation) quality can be most suppressed.

In the embodiment, as described above in the DCL channel selection processing with reference to FIG. 5 or the DCL channel selection processing according to the second exemplary embodiment with reference to FIG. 9, a wireless LAN channel is extracted in the descending order of the received electric field strength and the DCL channels corresponding to the extracted wireless LAN channel are excluded from among the 89 DCL channels until the remaining number of the DCL channels reaches 45. Alternatively, the 45 DCL channels may be selected in a reverse manner. That is, according to a DCL channel selection processing of one modified exemplary embodiment (one example of a selection unit), in S24 shown in FIGS. 5 and 9 of the first and the second DCL channel selection processing, a wireless LAN channel may be extracted in the ascending order of the received electric field strength (one example of a weak channel acquisition unit), and DCL channel selection may be repeated until the number of DCL channels selected from among the DCL channels corresponding to the extracted wireless LAN channel reaches 45. In this case, from among the DCL channels corresponding to one wireless LAN channel, the DCL channel is selected in the order starting at the DCL channel placed closer to both ends of the band indicated by the one wireless LAN channel. The DCL channel is selected in the order starting at the DCL channel placed at a distance as much as possible from the central frequency of the one wireless LAN channel, whereby the radio interference that the wireless communications 300 receive from the wireless communications 200 can be suppressed. Incidentally, in the above-described exemplary embodiments, 45 DCL channels are selected. However, the number of the DCL channel to be selected may be changed.

The MFP 1 of the embodiment includes the wireless LAN communication control circuit 17 and the DCL communication control circuit 19, but may include only the DCL communication control circuit 19. In this case, S22 and S23 are skipped in the flowchart of FIG. 5 or 9.

In the embodiment, the received electric field strength of the central frequency corresponding to each wireless LAN channel is measured, but the received electric field strength of a frequency in the proximity of the central frequency may be measured.

In the embodiment, the MFP 1 (MFP 31) has the function of the main device of the communication unit and the DCL mobile device 61 has the function of the mobile device of the communication unit, but the DCL mobile device 61 may have the function of the main device of the communication unit and the MFP 1 (MFP 31) has the function of the mobile device of the communication unit.

What is claimed is:

1. A communication system comprising:
   a main communication unit;
   a subcommunication unit configured to perform wireless communications with the main communication unit by using a plurality of first wireless channels, each of the plurality of first wireless channels indicating a respective band of a plurality of bands into which a predetermined frequency band is divided; and
   an external communication unit configured to perform wireless communications with the main communication unit by using a plurality of second wireless channels, each of the plurality of second wireless channels including a plurality of continuous first wireless channels in the predetermined frequency band,
   wherein the subcommunication unit comprises:
      a state detection unit configured to detect an electric field strength of a part or all of the plurality of second wireless channels, and
   wherein the main communication unit comprises:
      a memory;
      a central processing unit configured to operate as:
         a state acquisition unit connected to the state detection unit, via the wireless communications using the plurality of first wireless channels, and connected to the memory, wherein the state acquisition unit is configured to acquire the electric field strength of the part or all of the plurality of second wireless channels detected by the state detection unit and to store the electric field strength of the part or all of the plurality of second wireless channels in the memory; and
         a selection unit connected to the memory, wherein the selection unit is configured to select a predetermined number of the first wireless channels that generate reduced radio interference during the wireless communications performed between the main communication unit and the subcommunication unit from the plurality of first wireless channels based on the electric field strength of a part or all of the plurality of second wireless channels acquired and stored in the memory by the state acquisition unit and to store the selected predetermined number of the first wireless channels in the memory; and
      a digital cordless communication control unit configured to operate as:
         a channel determination unit connected to the memory, wherein the channel determination unit is configured to determine one of the predetermined number of the first wireless channels selected and stored in the memory by the selection unit every first period; and
         a first wireless communication unit configured to perform wireless communications with the subcommunication unit using the one of the predetermined number of the first wireless channels determined by the channel determination unit.

2. The communication system according to claim 1,
   wherein the state detection unit is configured to detect a strength of a radio wave received in the band corresponding to the second wireless channel as the electric field strength of the part or all of the plurality of second wireless channels, and
   wherein the selection unit comprises:
      a strong channel acquisition unit connected to the memory, wherein the strong channel acquisition unit is configured to acquire one of the plurality of second wireless channels in the descending order of the strength of the radio wave stored in the memory by the state acquisition unit; and
      a first excluding unit connected to the memory, wherein the first excluding unit is configured to exclude one of the plurality of continuous first wireless channels comprised in the second wireless channel acquired by the strong channel acquisition unit until a remaining number of the plurality of first wireless channels reaches the predetermined number, and
   wherein, when the first excluding unit excludes the one of the plurality of continuous first wireless channels, the selection unit is configured to select the remaining first wireless channels as the predetermined number of the first wireless channels that generate reduced radio interference.

3. The communication system according to claim 2,
wherein, when the first excluding unit excludes the one of the plurality of continuous first wireless channels comprised in the second wireless channel, when the remaining number of the first wireless channels becomes less than the predetermined number, the first excluding unit is configured to exclude preferentially the first wireless channel positioned at the center of the band corresponding to the second wireless channel.

4. The communication system according to claim 1,
wherein the state detection unit is configured to detect a strength of a radio wave received in the band corresponding to the second wireless channel as the electric field strength of the part or all of the plurality of second wireless channels, and
wherein the selection unit comprises:
  a strong channel acquisition unit connected to the memory, wherein the strong channel acquisition unit is configured to acquire one of the plurality of second wireless channels in the descending order of the strength of the radio wave stored in the memory by the state acquisition unit; and
  a second excluding unit connected to the memory, wherein the second excluding unit is configured to exclude a predetermined number of the plurality of continuous first wireless channels determined in accordance with the strength of the radio wave of the second wireless channel acquired by the strong channel acquisition unit until the number of first wireless channels reaches the predetermined number, and wherein the second excluding unit is configured to exclude preferentially the first wireless channel positioned at the center of the band corresponding to the second wireless channel, and
wherein, when the second excluding unit excludes the one of the plurality of continuous first wireless channels, the selection unit is configured to select the remaining first wireless channels as the predetermined number of the first wireless channels that generate reduced radio interference.

5. The communication system according to claim 1,
wherein the state detection unit is configured to detect a strength of a radio wave received in the band corresponding to the second wireless channel as the electric field strength of the part or all of the plurality of second wireless channels, and
wherein the selection unit comprises:
  a weak channel acquisition unit connected to the memory, wherein the weak channel acquisition unit is configured to acquire one of the plurality of second wireless channels in the ascending order of the strength of the radio waved stored in the memory by the state acquisition unit; and
  an election unit connected to the memory, wherein the election unit is configured to elect one of the plurality of continuous first wireless channels comprised in the second wireless channel acquired by the weak channel acquisition unit until the number of first wireless channels reaches the predetermined number, and
wherein the selection unit is configured to select the elected first wireless channels elected by the election unit as the predetermined number of the first wireless channels that generate reduced radio interference.

6. The communication system according to claim 2,
wherein the state detection unit is configured to detect the strength of the radio wave received at a substantially central frequency of the band corresponding to the second wireless channel as the electric field strength of the part or all of the plurality of second wireless channels.

7. The communication system according to claim 4,
wherein the state detection unit is configured to detect the strength of the radio wave received at a substantially central frequency of the band corresponding to the second wireless channel as the electric field strength of the part or all of the plurality of second wireless channels.

8. The communication system according to claim 5,
wherein the state detection unit is configured to detect the strength of the radio wave received at a substantially central frequency of the band corresponding to the second wireless channel as the electric field strength of the part or all of the plurality of second wireless channels.

9. The communication system according to claim 1,
wherein the main communication unit further comprises a local area network communication control unit configured to operate as:
  a second wireless communication unit configured to perform wireless communications with the external communication unit using one of the plurality of second wireless channels,
wherein the central processing unit further is configured to operate as:
  a second wireless channel acquisition unit connected to the memory, wherein the second wireless channel acquisition is configured to acquire from the memory the one of the plurality of second wireless channels used for the wireless communications with the external communication unit,
wherein the selection unit comprises:
  a third excluding unit connected to the memory, wherein the third excluding unit is configured to exclude the plurality of continuous first wireless channels comprised in the one of the plurality of second wireless channels acquired by the second wireless channel acquisition unit from the plurality of first wireless channels, and
wherein, when the third excluding unit excludes the plurality of continuous first wireless channels, the selection unit is configured to select the predetermined number of the first wireless channels from the remaining first wireless channels.

* * * * *